United States Patent
Weiher

(10) Patent No.: US 8,995,103 B2
(45) Date of Patent: *Mar. 31, 2015

(54) CIRCUIT BREAKER TRIP UNIT WITH DIGITAL POTENTIOMETER

(71) Applicant: Utility Relay Company, Ltd., Chagrin Falls, OH (US)

(72) Inventor: Helmut Weiher, Burton, OH (US)

(73) Assignee: Utility Relay Company, Chagrin Falls, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/451,803

(22) Filed: Aug. 5, 2014

(65) Prior Publication Data

US 2014/0340800 A1 Nov. 20, 2014

Related U.S. Application Data

(63) Continuation of application No. 13/275,509, filed on Oct. 18, 2011, now Pat. No. 8,837,103.

(60) Provisional application No. 61/394,473, filed on Oct. 19, 2010.

(51) Int. Cl.
| | | |
|---|---|---|
| *H02H 3/00* | (2006.01) | |
| *H02H 3/08* | (2006.01) | |
| *H02H 3/093* | (2006.01) | |
| *H01H 69/01* | (2006.01) | |
| *H01H 71/74* | (2006.01) | |

(52) U.S. Cl.
CPC .............. *H02H 3/08* (2013.01); *H01H 69/01* (2013.01); *H01H 71/74* (2013.01); *H02H 3/006* (2013.01); *H02H 3/093* (2013.01)
USPC .......................................................... 361/95

(58) Field of Classification Search
USPC .................................................. 361/93.2, 95
See application file for complete search history.

(56) References Cited

U.S. PATENT DOCUMENTS

| | | | |
|---|---|---|---|
| 4,335,437 A | 6/1982 | Wilson | |
| 4,878,144 A * | 10/1989 | Nebon | 361/96 |
| 6,621,672 B2 | 9/2003 | Bilac | |
| 7,505,820 B2 | 3/2009 | Plivcic | |
| 7,564,667 B2 | 7/2009 | Veroni | |
| 8,837,103 B2 * | 9/2014 | Weiher | 361/96 |
| 2007/0008670 A1 | 1/2007 | Fletcher | |
| 2008/0013238 A1 * | 1/2008 | Colsch et al. | 361/93.2 |
| 2008/0094768 A1 | 4/2008 | Perra | |
| 2009/0147424 A1 | 6/2009 | Vicente | |
| 2009/0225483 A1 | 9/2009 | Veroni | |
| 2012/0092802 A1 | 4/2012 | Weiher | |
| 2012/0181152 A1 | 7/2012 | Carlino | |
| 2012/0287543 A1 | 11/2012 | Schlotterer | |
| 2013/0148249 A1 | 6/2013 | Schlotterer | |

* cited by examiner

*Primary Examiner* — Ronald W Leja
(74) *Attorney, Agent, or Firm* — Pearne & Gordon LLP

(57) ABSTRACT

A circuit breaker trip unit includes an input section receiving a phase current level signal. A processor is in communication with the input section and generates a first trip signal based on the phase current level signal and user-adjustable trip settings. The trip settings include long time and short time pickup and delay settings. An analog instantaneous trip circuit is in communication with both of the input section and the processor. The analog instantaneous trip circuit includes a digital potentiometer having a non-volatile memory. The potentiometer provides a reference signal corresponding to a resistance setting stored in the memory. The analog instantaneous trip circuit compares the phase current level and reference signals, and generates a second trip signal based on a result of the comparing. The processor programs the resistance setting stored in the memory according to a user-adjustable instantaneous current pickup setting.

17 Claims, 3 Drawing Sheets

CIRCUIT BREAKER TRIP UNIT WITH DIGITAL POTENTIOMETER

CROSS-REFERENCE TO RELATED APPLICATIONS

This application is a continuation of U.S. patent application Ser. No. 13/275,509, filed Oct. 18, 2011 (now U.S. Pat. No. 8,837,103), which claims the benefit of U.S. Provisional Patent Application Ser. No. 61/394,473, filed Oct. 19, 2010. The disclosures of both U.S. patent application Ser. No. 13/275,509 and U.S. Provisional Patent Application Ser. No. 61/394,473 are hereby incorporated herein by reference.

BACKGROUND OF THE INVENTION

1. Field of the Invention

The present invention relates to electrical overcurrent protection devices, particularly electronic trip units for circuit breakers.

2. Description of Related Art

Circuit breakers are used in electrical distribution systems to protect electrical conductors and equipment against the effects of short circuits, ground faults, overloads and/or overcurrent conditions (collectively "abnormal current conditions"). Some circuit breakers have programmable electronic controllers for controlling operations of the circuit breaker. The programmable electronic controllers are known as electronic trip units and circuit breakers employing electronic trip units are known as electronic trip circuit breakers. The electronic trip unit monitors the conditions of an electrical circuit protected by its associated circuit breaker, and signals the circuit breaker to trip upon detecting an abnormal current condition.

BRIEF SUMMARY OF THE INVENTION

In accordance with one aspect, provided is a circuit breaker electronic trip unit. The trip unit includes an input section for receiving a phase current level signal. A processor is in communication with the input section. The processor generates a first circuit breaker trip signal based on the phase current level signal and user-adjustable trip settings. The user-adjustable trip settings include a long time current pickup setting, a long time delay setting, a short time current pickup setting, and a short time delay setting. An analog instantaneous trip circuit is in communication with both of the input section and the processor. The analog instantaneous trip circuit includes a digital potentiometer having a non-volatile memory. The digital potentiometer provides a reference signal corresponding to a resistance setting stored in the non-volatile memory. The analog instantaneous trip circuit compares the phase current level signal to the reference signal and generates a second circuit breaker trip signal based on a result of comparing the phase current level signal to the reference signal. The processor programs the resistance setting stored in the non-volatile memory of the digital potentiometer according to a user-adjustable instantaneous current pickup setting.

In accordance with another aspect, provided is a circuit breaker electronic trip unit. The trip unit includes an input section for receiving a phase current level signal, and a user interface. A trip output provides a trip command to a circuit breaker actuator. A processor is in communication with the input section and the user interface. The processor comprises a communications port. The processor generates a first circuit breaker trip signal based on the phase current level signal. An analog instantaneous trip circuit is in communication with both of the input section and the processor. The analog instantaneous trip circuit includes a digital potentiometer having a non-volatile memory. The digital potentiometer provides a reference signal corresponding to a resistance setting stored in the non-volatile memory. The analog instantaneous trip circuit includes an analog comparator that compares the phase current level signal to the reference signal. The analog instantaneous trip circuit generates a second circuit breaker trip signal based on a result of comparing the phase current level signal to the reference signal. The processor programs the resistance setting stored in the non-volatile memory of the digital potentiometer through the communications port of the processor and according to a user-adjustable instantaneous current pickup setting. The circuit breaker electronic trip unit generates the trip command when either one of the first circuit breaker trip signal and the second circuit breaker trip signal is generated.

In accordance with another aspect, a method for tripping a circuit breaker is provided. The method includes the step of receiving, by a processor in an electronic trip unit, an instantaneous current pickup setting, a long time current pickup setting and a short time current pickup setting, wherein the instantaneous current pickup setting, the long time current pickup setting and the short time current pickup setting are adjustable by a user. The processor monitors a phase current level in an electrical circuit protected by the circuit breaker. An analog instantaneous trip circuit in the electronic trip unit also monitors the phase current level in the electrical circuit protected by the circuit breaker. The analog instantaneous trip circuit includes a digital potentiometer having a non-volatile memory storing a resistance setting of the digital potentiometer. The digital potentiometer provides a reference level for the analog instantaneous trip circuit according to the resistance setting. The monitoring by the analog instantaneous trip circuit includes comparing the reference level to the phase current level. The processor programs the resistance setting of the digital potentiometer according to the instantaneous current pickup setting. The processor generates a first circuit breaker trip signal based on the processor determining that the phase current level exceeds at least one of the long time current pickup setting and the short time current pickup setting. The analog instantaneous trip circuit generates a second circuit breaker trip signal based on a result of said comparing the reference level to the phase current level.

DETAILED DESCRIPTION OF THE INVENTION

Figure 1A:
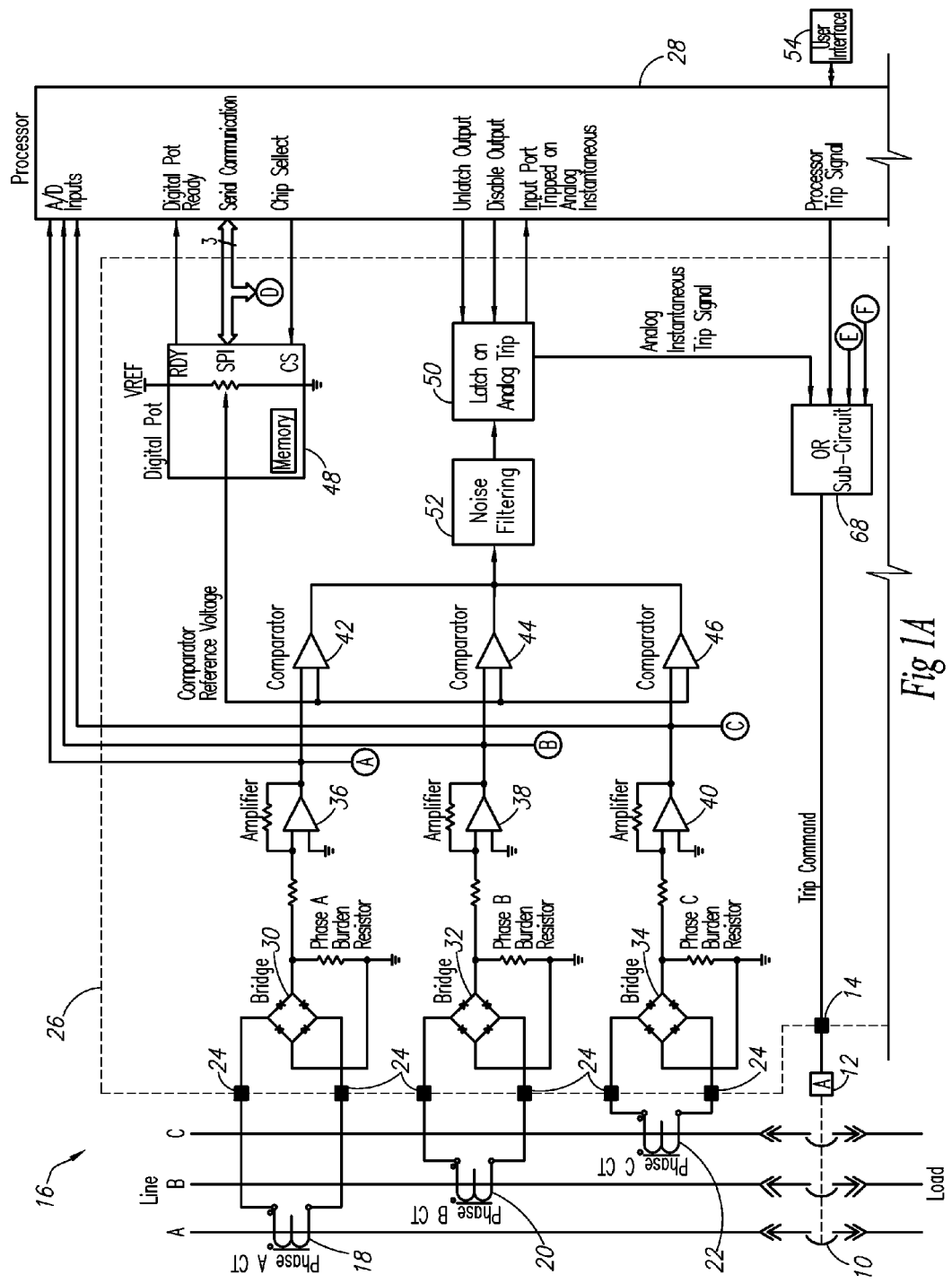
FIG. 1a is a schematic diagram of a circuit protection system.

Example embodiments will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the corresponding subject matter. It may be evident, however, that the present invention can be practiced without these specific details. Additionally, other embodiments of the invention are possible and the invention is capable of being practiced and carried out in ways other than as described. The terminology and phraseology used herein is employed for the purpose of promoting an understanding of the invention and should not be taken as limiting.

Circuit breaker trip units can provide instantaneous fault protection based on an instantaneous current pickup setting. In circuit breaker trip units for 600 V class circuit breakers, the instantaneous fault protection is defined as not incorporating intentional time delay.

Instantaneous fault protection can be provided by analog circuits, such as peak-detecting analog circuits, that sense a fault condition in a power circuit protected by the circuit breaker and then generate a trip signal for the circuit breaker. The trip signal is then provided to a circuit breaker actuator to trip the breaker. Such analog circuits respond quickly to fault conditions and are ready for operation as soon as the trip unit's internal power supplies are functional. The fast operation time of analog instantaneous trip circuits can serve to minimize arc flash energy hazard to personnel and equipment.

Analog instantaneous trip circuits have several disadvantages. For example, the pickup settings available for selection by a user might be limited to a few choices as provided by a multi-position selector switch. Logic, such as microprocessor logic, is not available to limit the range of instantaneous pick-up settings based on other conditions or parameters. Logic is not available to provide an OFF setting for the instantaneous protection, disabling the instantaneous protection, based on other conditions or parameters. Prevention of unauthorized access to the instantaneous current pickup setting might not be reliable in analog instantaneous trip circuits, which can lead to unauthorized and potentially dangerous changes to the instantaneous setting.

Instantaneous fault protection can also be provided by microprocessor-based circuits that monitor the phase current of a power feed via analog-to-digital (A/D) converters. Microprocessor-based instantaneous fault protection can address the disadvantages associated with analog instantaneous trip circuits. For example, a microprocessor can provide a large number of user-selectable trip settings, and can use logic to limit the range of selectable settings and/or provide an OFF setting for the instantaneous protection. A microprocessor can also prevent unauthorized personnel from making changes to the trip setting through passwords and the like.

However, microprocessor-based circuits do not become operational as quickly as analog circuits. The microprocessor takes some time to compete its boot sequence upon startup, and it takes some time for an associated clock oscillator to start and stabilize. Since microprocessor-based circuits take longer to become operational than analog trip circuits, the potential arc flash energy hazard to personnel and equipment is greater with microprocessor-based circuits.

The electronic trip unit discussed below includes a fast-acting analog instantaneous trip circuit in addition to a processor (e.g., a microprocessor or microcontroller). The processor programs the resistance settings of one or more digital potentiometers in the analog instantaneous trip circuit. The resistance settings determine how the analog instantaneous trip circuit will generate one or more trip signals for a circuit breaker actuator. The processor can accommodate a large number of trip settings, provide logic to limit the range of available settings, program multiple digital potentiometers, and can provide an OFF setting to disable instantaneous protection. The processor can also provide additional trip settings (e.g., long time, short time, ground fault) for the trip unit, and functions such as password protection.

Figure 1B:
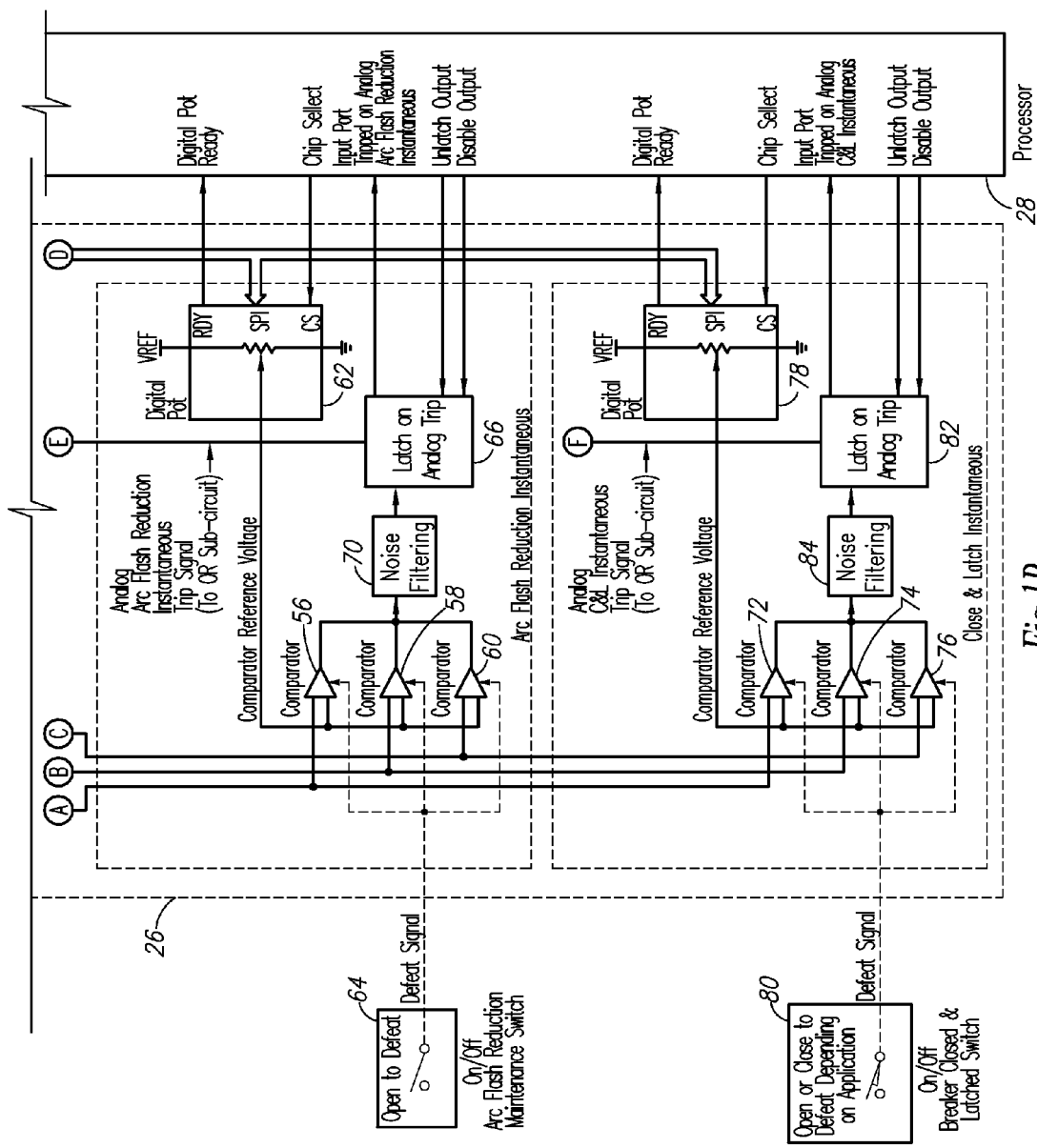
FIG. 1b is a schematic diagram of the circuit protection system.

FIGS. 1a and 1b provide a schematic diagram of a circuit protection system. The circuit protection system includes a circuit breaker 10 and its actuator 12. The actuator 12 receives a trip command from a trip output 14 of an electronic trip unit 16. At least one electrical phase conductor is opened by the circuit breaker 10 when its actuator 12 receives the trip command. In the embodiment shown in FIG. 1a and 1b, three electrical phase conductors (phase A, phase B, phase C) are opened by the circuit breaker 10. Current transformers (CTs) 18, 20, 22 on the phase conductors provide phase current level signals to the electronic trip unit 16. The electronic trip unit 16 receives the phase current level signals through an input section 24 of the trip unit. The electronic trip unit 16 uses the phase current level signals to determine the existence of abnormal current conditions. A CT could also be provided on a neutral conductor (not shown) of the power circuit, for determining ground faults on a 4-wire system, for example.

The electronic trip unit 16 includes both an analog instantaneous trip circuit 26 and a processor 28. An example processor 28 for use in the electronic trip unit 16 is microcontroller MSP430 available from TEXAS INSTRUMENTS. The analog instantaneous trip circuit 26 and the processor 28 are in communication with the input section 24 and monitor the phase current level signals for an abnormal current condition. The analog instantaneous trip circuit 26 and processor 28 are also in communication with each other and with the trip output 14. Both the analog instantaneous trip circuit 26 and the processor 28 can generate the trip command to the actuator 12 to trip the circuit breaker.

In an example embodiment, the analog instantaneous trip circuit 26 includes bridge rectifiers 30, 32, 34 that rectify the phase current level signals from respective CTs. The rectified phase current level signals are amplified by respective amplifiers 36, 38, 40 in the analog instantaneous trip circuit 26. The rectified and amplified phase current level signals are provided to respective analog comparators 42, 44, 46, and are also provided to the processor 28 (for example through A/D converters on the processor). In FIG. 1a, the processor 28 is in communication with the input section 24 through the analog instantaneous trip circuit 26, receiving the rectified and amplified phase current level signals. It is to be appreciated that the processor 28 could receive the output of the CTs directly, as the analog instantaneous trip circuit 26 does. Alternatively, one or both of the analog instantaneous trip circuit 26 and the processor 28 could be in communication with the input section 24 through intermediate sub-circuits, such as isolation circuits or sampling circuits for example. Thus, neither the analog instantaneous trip circuit 26 nor the processor 28 need be in direct communication with the input section 24 in order to receive and process the phase current level signals from the CTs.

The comparators 42, 44, 46 receive a reference signal from a digital potentiometer 48 and compare the phase current level signals to the reference signal from the digital potentiometer. Based on a result of comparing the phase current level signals to the reference signal, the analog instantaneous trip circuit 26 can generate a trip signal to trip the circuit breaker 10. For example, when the phase current level signal at a comparator exceeds the reference signal, the comparator can generate an output signal that is provided to a latching sub-circuit 50. The output signal from the comparator can be filtered by a noise filter 52, if desired. The latching sub-circuit 50 receives the output signals from the comparators 42, 44, 46 and generates a latched analog instantaneous trip signal to trip the circuit breaker, based on the signals from the comparators.

The reference signal from the digital potentiometer 48 can be a reference voltage level from a voltage divider formed by the digital potentiometer. The resistance setting of the digital potentiometer determines the reference voltage level. A higher reference voltage from the digital potentiometer 48 can provide a higher instantaneous trip threshold. The digital potentiometer 48 has a non-volatile memory for storing its resistance setting, so that the digital potentiometer retains its last resistance setting when power is removed.

The processor 28 programs the resistance setting stored in the non-volatile memory of the digital potentiometer 48. For example, the processor 28 can include a serial communications port for communicating with and programming the digital potentiometer 48. Serial communications between the processor 28 and the digital potentiometer 48 can take place over various bus structures, such as an "SPI" bus or an "I²C" bus.

An example digital potentiometer for use in the electronic trip unit is model AD5231, which is a 1024 position digital potentiometer available from ANALOG DEVICES.

The processor 28 programs the resistance setting stored in the non-volatile memory of the digital potentiometer 48 according to a user-adjustable instantaneous current pickup setting. The electronic trip unit 16 includes a user interface device 54 that allows the user to adjust operating parameters of the electronic trip unit 16, such as the various current pickup settings and time delays implemented by the electronic trip unit. The user can also view present operating conditions (e.g., voltage and current levels in the power circuit protected by the circuit breaker), alarm conditions, historical data, etc. through the user interface. It is to be appreciated that the user interface 54 can be located on the trip unit 16 itself, or mounted to an enclosure for the circuit breaker and trip unit, or placed remote from the trip unit. Through the user interface 54, the user can set the desired instantaneous current pickup setting, which is a phase current level at which the electronic trip unit 16 should generate the analog instantaneous trip signal. The processor 28 receives the instantaneous current pickup setting from the user interface device 54 and stores the setting in a memory (not shown) associated with the processor. The processor 28 programs the resistance setting of the digital potentiometer 48 based on the instantaneous current pickup setting, so that the reference signal from the digital potentiometer that is provided to the comparators 42, 44, 46 corresponds to the desired instantaneous current pickup setting.

In addition to analog instantaneous tripping by the analog instantaneous trip circuit 26, the electronic trip unit 16 also provides for tripping by the processor 28 itself. The processor 28 generates a trip signal according to various user-adjustable settings, such as a long time current pickup setting, a long time delay setting, a short time current pickup setting, and a short time delay setting. Further, the processor 28 can receive a user-adjustable ground fault current pickup setting and a ground fault delay setting. Ground fault protection can be implemented directly by the processor 28, similar to the long time and short time protection, or by programmable discrete circuitry in communication with the processor, similar to the instantaneous protection described above. The processor 28 can also provide "maintenance mode" settings for reducing potential arc flash during maintenance of downstream breakers. Example maintenance mode settings include a maintenance mode instantaneous current pickup setting and a maintenance mode ground fault current pickup setting. Maintenance mode settings are lower trip settings that cause the circuit breaker to open as quickly as possible during an abnormal current condition. Both in the normal mode and the maintenance mode, the processor monitors the phase current levels in the power circuit protected by the circuit breaker and generates a trip signal based on its user-adjustable trip settings. However, instantaneous tripping, whether normal mode, maintenance mode, other special purpose modes, etc., is primarily implemented by the analog instantaneous trip circuit 26. The processor 28 could generate a trip signal based on an instantaneous current pickup setting. However, such a trip signal would act as a backup to tripping by the analog instantaneous trip circuit 26.

Either one of the analog instantaneous trip signal and the trip signal from the processor 28 will cause the trip unit 16 to send a trip command to the actuator 12. In FIG. 1a, the analog instantaneous trip signal and the trip signal from the processor 28 are "OR'd" by an OR sub-circuit 68. The OR sub-circuit 68 generates the trip command to the actuator 12 when it receives any of the analog instantaneous trip signal, the trip signal from the processor 28, and additional instantaneous trip signals as discussed below.

The latching sub-circuit 50 receives the output signals from the comparators 42, 44, 46 and generates a latched analog instantaneous trip signal. The analog instantaneous trip signal remains latched ON until the latching sub-circuit 50 receives an unlatch output signal from the processor 28 (e.g., after the fault is cleared). The processor 28 receives an output signal from the analog instantaneous trip circuit 26, for example from the latching sub-circuit 50, that tells the processor that the analog instantaneous trip signal has been generated.

The processor 28 can selectively disable instantaneous tripping by providing a disable control signal to the analog instantaneous trip circuit 26, for example to the latching sub-circuit 50. A user might wish to disable instantaneous tripping for purposes of selective coordination of circuit breakers. The user would disable instantaneous tripping through a selection at the user interface device 54, and the processor 28 would respond to a disable command or signal input from the interface by providing the disable control signal to the latching sub-circuit 50, for example. The processor 28 will cease disabling instantaneous protection when the user subsequently enables instantaneous protection, enables a maintenance mode, or based on the status of various inputs and/or parameters of the processor.

As discussed above, the processor 28 can provide "maintenance mode" settings for reducing potential arc flash during maintenance of downstream breakers. One such maintenance mode setting is a maintenance mode instantaneous current pickup setting. The processor 28 can adjust the resistance setting of the digital potentiometer 48 according to the maintenance mode instantaneous current pickup setting when the maintenance mode is enabled, to thereby lower the instantaneous trip setting of the trip unit 26. The processor 28 can then return the resistance setting to its normal instantaneous setting when maintenance mode is subsequently disabled after maintenance is complete.

In certain embodiments, the analog instantaneous trip circuit 26 includes additional comparators and associated digital potentiometers, to generate additional analog instantaneous trip signals that are "OR'd" with other trip signals by the OR sub-circuit 68. FIG. 1b includes comparators 56, 58, 60 and an associated digital potentiometer 62 for generating an arc flash reduction instantaneous trip signal when maintenance mode is enabled. Maintenance mode is enabled and disabled by a selector switch 64. In FIG. 1b, the selector switch 64 provides a defeat signal to the comparators 56, 58, 60 to disable maintenance mode tripping. Alternatively, the selector switch 64 can provide an enable signal to the comparators, or a signal to the processor 28 for enabling/disabling the maintenance mode. The comparators 56, 58, 60 receive the rectified and amplified phase current level signals and compare them to a reference signal from the digital potentiometer 62. The processor 28 programs the resistance setting of digital potentiometer 62 according to the maintenance mode instantaneous current pickup setting. The maintenance mode instantaneous current pickup setting would typically be lower than a normal instantaneous current pickup setting used to program digital potentiometer 48 in FIG. 1a, to reduce potential arc flash during maintenance. Thus, the resistance setting of digital potentiometer 62 would typically have a different value (i.e., higher or lower) than the resistance setting of digital potentiometer 48, to provide different trip settings. The processor 28 can program the resistance settings of both digital potentiometer 48 and digital potentiometer 62 via serial communications over a serial communications bus, as shown schematically in FIGS. 1a and 1b.

If normal instantaneous protection has been disabled, then the maintenance mode instantaneous current pickup setting will provide instantaneous protection under special circumstances when maintenance mode is enabled.

A latching sub-circuit 66 generates an analog arc flash reduction instantaneous trip signal (e.g., a maintenance mode trip signal) when a phase current level signal at the comparators 56, 58, 60 exceeds the reference signal from the digital potentiometer 62. The latching sub-circuit 66 operates similarly to the latching sub-circuit 50 discussed above. The analog arc flash reduction instantaneous trip signal from the latching sub-circuit 66 is "OR'd" with other trip signals by the OR sub-circuit 68. A noise filter 70 can be provided between the latching sub-circuit 66 and the comparators 56, 58, 60.

The analog instantaneous trip circuit further includes comparators 72, 74, 76 and associated digital potentiometer 78 for generating an analog breaker closed and latched instantaneous trip signal. The comparators 72, 74, 76 receive the rectified and amplified phase current level signals and compare them to a reference signal from the digital potentiometer 78. The processor 28 programs the resistance setting of digital potentiometer 78 according to a close and latch rating for the circuit breaker 10, which can be entered by the user through the user interface 54. The processor could also retrieve the close and latch rating for the circuit breaker 10 from a local or remote database using a circuit breaker model number, for example. A circuit breaker's close and latch rating is the rated fault current onto which the circuit breaker can successfully close and latch. The close and latch rating might be lower than an instantaneous current pickup setting for the trip unit 16, or instantaneous protection might be turned OFF. Closed and latched instantaneous protection is enabled while the circuit breaker 10 is open. Once the circuit breaker 10 has successfully closed and latched, the closed and latched instantaneous protection is disabled. A limit switch 80 within the circuit breaker 10 disables the closed and latched instantaneous protection when the circuit breaker is fully closed and latched. The processor 28 programs the resistance setting of digital potentiometer 78 via serial communications over the serial communications bus. A latching sub-circuit 82 generates the analog breaker closed and latched instantaneous trip signal when a phase current level signal at the comparators 72, 74, 76 exceeds the reference signal from the digital potentiometer 78. The analog breaker closed and latched instantaneous trip signal from the latching sub-circuit 82 is "OR'd" with the other trip signals by the OR sub-circuit 68. A noise filter 84 can be provided between the latching sub-circuit 82 and the comparators 72, 74, 76.

The processor 28 can provide a large number of instantaneous trip settings for the analog instantaneous trip circuit 26, which are available for selection by the user. The processor 28 can also limit the settings available for selection by the user according to logic within the processor and/or based on the status of various inputs and/or parameters of the processor. For example, the processor 28 can disable a plurality of current pickup settings available for user selection as the instantaneous current pickup setting when the processor receives a particular input signal, such as a signal from the user interface 54. The processor can also provide protection, such as password or biometric protection, so that only authorized users are allowed to change settings of the trip unit. For example, an authorized user who enters a correct password or biometric information (e.g., a fingerprint) as verified by the processor 28, would be allowed to make changes to the instantaneous current pickup setting.

Whenever the electronic trip unit 16 is powered-up, the instantaneous protection provided by the analog instantaneous trip circuit 26 becomes operational more quickly than the long time and short time protection provided by the processor 28, and the ground fault protection if implemented by the processor. This is due to the fact that the processor 28 must execute a boot sequence, wait for its clock to stabilize, etc., before it can generate a trip signal. Since the resistance settings of the digital potentiometers are stored in non-volatile memory, the reference voltages from the digital potentiometers are generated as soon as an internal power supply of the trip unit reaches its operating value. The analog instantaneous trip circuit 26 does not have to wait for the boot sequence to be completed before it can generate its trip signal(s). Thus, the analog instantaneous trip circuit 26 can generate its trip signal(s) while the processor 28 is still executing the boot sequence. The fast-acting nature of the analog instantaneous trip circuit 26 can help to minimize potential arc flash hazard to personnel and equipment.

Figure 2:
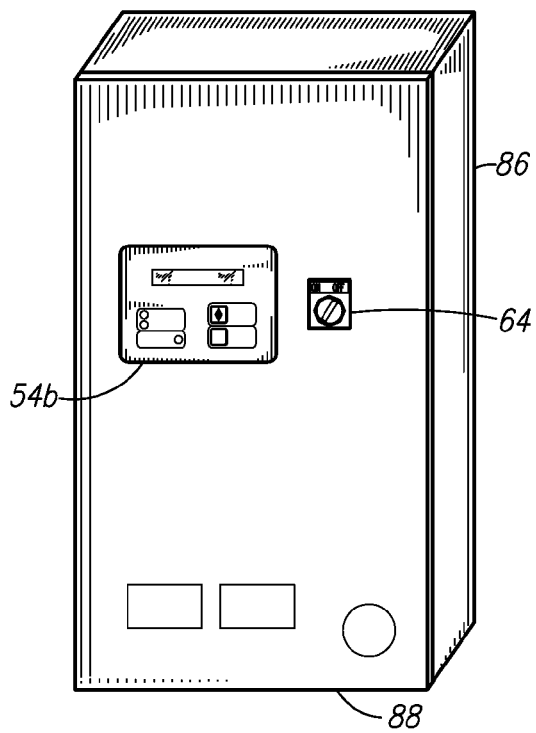
FIG. 2 is an exterior perspective view of an enclosure for a circuit breaker.
Figure 3:
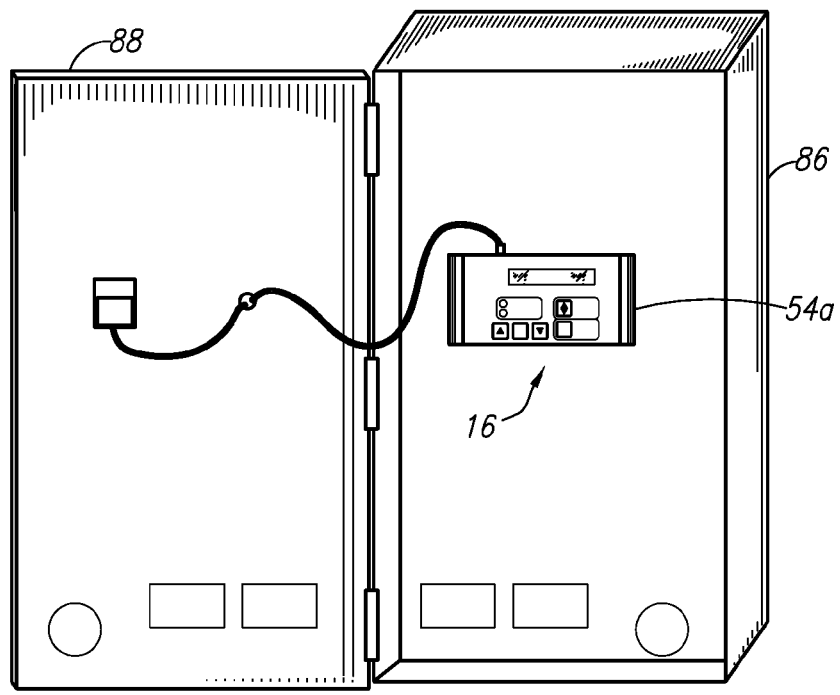
FIG. 3 is an interior perspective view of an enclosure for a circuit breaker.

FIGS. 2 and 3 show an example circuit breaker enclosure 86 for a circuit breaker having the electronic trip unit 16. The electronic trip unit 16 has a local user interface 54a mounted on the trip unit. The local user interface 54a is accessible when the door 88 of the enclosure 86 is open. The electronic trip unit 16 also has a user interface 54b mounted to the door 88 that is accessible when the door is closed. The selector switch 64 for enabling the maintenance mode is also provided on the door 88. It is to be appreciated that either of the door-mounted interface devices 54b, 64 can be mounted remotely from the circuit breaker enclosure 86, such as in a control room or near downstream electrical equipment. Circuit breaker trip settings can be adjusted using either of the user interfaces 54a, 54b.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A circuit breaker electronic trip unit, comprising:
   an input section for receiving a phase current level signal;
   a processor in communication with the input section, wherein the processor generates a first circuit breaker trip signal based on the phase current level signal and a user-adjustable trip setting;
   an analog instantaneous trip circuit in communication with both of the input section and the processor, wherein the analog instantaneous trip circuit includes a digital potentiometer having a non-volatile memory, the digital potentiometer providing a reference signal corresponding to a resistance setting stored in the non-volatile memory, wherein the analog instantaneous trip circuit compares the phase current level signal to the reference signal and generates a second circuit breaker trip signal based on a result of comparing the phase current level signal to the reference signal, and wherein the processor programs the resistance setting stored in the non-volatile memory of the digital potentiometer according to a user-adjustable instantaneous current pickup setting, and wherein the analog instantaneous trip circuit can generate the second circuit breaker trip signal during a boot sequence executed by the processor.

2. The circuit breaker electronic trip unit of claim 1, further comprising:

a trip output for providing a trip command to a circuit breaker actuator, and an OR sub-circuit that generates the trip command;

wherein the analog instantaneous trip circuit includes another digital potentiometer, programmed by the processor, and having a different value resistance setting and providing another reference signal, wherein the analog instantaneous trip circuit compares the phase current level signal to the another reference signal and generates a third circuit breaker trip signal based on a result of comparing the phase current level signal to the another reference signal; and wherein the OR sub-circuit receives the first circuit breaker trip signal, the second circuit breaker trip signal, and the third circuit breaker trip signal and generates the trip command based on one or more of the first circuit breaker trip signal, the second circuit breaker trip signal, and the third circuit breaker trip signal.

3. The circuit breaker electronic trip unit of claim 1, wherein the user-adjustable instantaneous current pickup setting is password-protected by the processor.

4. The circuit breaker electronic trip unit of claim 1, wherein the processor provides an output signal to the analog instantaneous trip circuit that selectively disables instantaneous tripping, and wherein the processor includes a serial communications port, and the processor programs the resistance setting stored in the non-volatile memory of the digital potentiometer through serial communications output from the serial communication port.

5. The circuit breaker electronic trip unit of claim 1, further comprising a trip output for providing a trip command to a circuit breaker actuator, wherein the circuit breaker electronic trip unit generates the trip command when either one of the first circuit breaker trip signal and the second circuit breaker trip signal is generated.

6. The circuit breaker electronic trip unit of claim 1, wherein the analog instantaneous trip circuit includes:

an analog comparator that compares the phase current level signal to the reference signal;

a bridge rectifier that rectifies the phase current level signal, and an amplifier that amplifies an output of the bridge rectifier, wherein the amplifier provides a rectified and amplified phase current level signal to the analog comparator.

7. The circuit breaker electronic trip unit of claim 1, wherein the analog instantaneous trip circuit includes:

an analog comparator that compares the phase current level signal to the reference signal; and a latching sub-circuit that latches the second circuit breaker trip signal, wherein the latching sub-circuit selectively unlatches the second circuit breaker trip signal based on an unlatch output signal from the processor.

8. A circuit breaker electronic trip unit, comprising:

an input section for receiving a phase current level signal;

a user interface;

a trip output for providing a trip command to a circuit breaker actuator;

a processor in communication with the input section and the user interface, wherein the processor generates a first circuit breaker trip signal based on the phase current level signal;

an analog instantaneous trip circuit in communication with both of the input section and the processor, wherein the analog instantaneous trip circuit includes a digital potentiometer having a non-volatile memory, the digital potentiometer providing a reference signal corresponding to a resistance setting stored in the non-volatile memory, wherein the analog instantaneous trip circuit includes an analog comparator that compares the phase current level signal to the reference signal, and the analog instantaneous trip circuit generates a second circuit breaker trip signal based on a result of comparing the phase current level signal to the reference signal, wherein the processor programs the resistance setting stored in the non-volatile memory of the digital potentiometer according to a user-adjustable instantaneous current pickup setting, wherein the circuit breaker electronic trip unit generates the trip command when either one of the first circuit breaker trip signal and the second circuit breaker trip signal is generated, and wherein the processor provides an output signal to the analog instantaneous trip circuit that selectively disables instantaneous tripping.

9. The circuit breaker electronic trip unit of claim 8, wherein the analog instantaneous trip circuit can generate the second circuit breaker trip signal during a boot sequence executed by the processor.

10. The circuit breaker electronic trip unit of claim 8, further comprising:

an OR sub-circuit that generates the trip command;

wherein the analog instantaneous trip circuit includes another digital potentiometer, programmed by the processor, and having a different value resistance setting and providing another reference signal, wherein the analog instantaneous trip circuit compares the phase current level signal to the another reference signal and generates a third circuit breaker trip signal based on a result of comparing the phase current level signal to the another reference signal; and wherein the OR sub-circuit receives the first circuit breaker trip signal, the second circuit breaker trip signal, and the third circuit breaker trip signal and generates the trip command when one or more of the first circuit breaker trip signal, the second circuit breaker trip signal, and the third circuit breaker trip signal is generated.

11. The circuit breaker electronic trip unit of claim 8, wherein the user-adjustable instantaneous current pickup setting is password-protected by the processor.

12. The circuit breaker electronic trip unit of claim 8, wherein the analog instantaneous trip circuit includes a bridge rectifier that rectifies the phase current level signal, and an amplifier that amplifies an output of the bridge rectifier, wherein the amplifier provides a rectified and amplified phase current level signal to the analog comparator, and wherein the analog instantaneous trip circuit includes a latching sub-circuit that latches the second circuit breaker trip signal, wherein the latching sub-circuit selectively unlatches the second circuit breaker trip signal based on an unlatch output signal from the processor.

13. A method for tripping a circuit breaker, comprising the steps of:
receiving, by a processor in an electronic trip unit, an instantaneous current pickup setting and another current pickup setting, wherein the instantaneous current pickup setting and the another current pickup setting are adjustable by a user;
monitoring, by the processor, a phase current level in an electrical circuit protected by the circuit breaker;
monitoring, by an analog instantaneous trip circuit in the electronic trip unit, the phase current level in the electrical circuit protected by the circuit breaker, the analog instantaneous trip circuit including a digital potentiometer having a non-volatile memory storing a resistance setting of the digital potentiometer, wherein the digital potentiometer provides a reference level for the analog instantaneous trip circuit according to the resistance setting, and wherein said monitoring by the analog instantaneous trip circuit includes comparing the reference level to the phase current level;
programming, by the processor, the resistance setting of the digital potentiometer according to the instantaneous current pickup setting;
generating, by the processor, a first circuit breaker trip signal based on the processor determining that the phase current level exceeds the another current pickup setting, or generating, by the analog instantaneous trip circuit, a second circuit breaker trip signal based on a result of said comparing the reference level to the phase current level;
selectively disabling, by the processor, instantaneous tripping of the circuit breaker by the analog instantaneous trip circuit; and
selectively enabling, by the processor, instantaneous tripping of the circuit breaker by the analog instantaneous trip circuit.

14. The method of claim 13, wherein said monitoring by the analog instantaneous trip circuit includes comparing the phase current level to another reference level provided by another digital potentiometer having a different resistance setting value programmed by the processor,
the method further comprising the steps of:
generating, by the analog instantaneous trip circuit, a third circuit breaker trip signal based on a result of said comparing the phase current level to the another reference level; and
generating, by an OR sub-circuit in the analog instantaneous trip circuit, a trip command for a circuit breaker actuator when at least one of the first circuit breaker trip signal, the second circuit breaker trip signal, and the third circuit breaker trip signal is generated.

15. The method of claim 13, further comprising the steps of:
receiving, by the processor, an input signal; and
disabling a plurality of current pickup settings available for user selection as the instantaneous current pickup setting when the input signal has been received by the processor.

16. The method of claim 13, further comprising the steps of:
receiving, by the processor, a password from a user interface of the electronic trip unit; and
verifying the password and allowing adjustment of the instantaneous current pickup setting when the password is verified.

17. The method of claim 13, further comprising the steps of:
latching the second circuit breaker trip signal;
receiving an unlatch signal from the processor; and
unlatching the second circuit breaker trip signal upon receiving the unlatch signal from the processor.

* * * * *